US012499799B2

(12) United States Patent
Cao et al.

(10) Patent No.: US 12,499,799 B2
(45) Date of Patent: Dec. 16, 2025

(54) DISPLAY PANEL AND DISPLAY DEVICE

(71) Applicant: Wuhan China Star Optoelectronics Technology Co., Ltd., Hubei (CN)

(72) Inventors: Haiming Cao, Hubei (CN); Chao Tian, Hubei (CN); Fei Ai, Hubei (CN); Guanghui Liu, Hubei (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 188 days.

(21) Appl. No.: 17/915,517

(22) PCT Filed: Sep. 1, 2022

(86) PCT No.: PCT/CN2022/116439
§ 371 (c)(1),
(2) Date: Sep. 29, 2022

(87) PCT Pub. No.: WO2024/031760
PCT Pub. Date: Feb. 15, 2024

(65) Prior Publication Data

US 2024/0296767 A1 Sep. 5, 2024

(30) Foreign Application Priority Data

Aug. 12, 2022 (CN) ......................... 202210967492.6

(51) Int. Cl.
*G09G 3/20* (2006.01)

(52) U.S. Cl.
CPC ....... *G09G 3/20* (2013.01); *G09G 2300/0408* (2013.01); *G09G 2310/0267* (2013.01); *G09G 2320/0233* (2013.01)

(58) Field of Classification Search
CPC ............. G09G 3/20; G09G 2300/0408; G09G 2310/0267; G09G 2320/0233
See application file for complete search history.

(56) References Cited

U.S. PATENT DOCUMENTS 12,002,397 B2 6/2024 Wan et al.
2012/0293467 A1* 11/2012 Lee ...................... G09G 3/3677 345/204

(Continued)

FOREIGN PATENT DOCUMENTS

CN 102789757 11/2012
CN 104537992 4/2015

(Continued)

OTHER PUBLICATIONS

English Translation of CN 106782240 (Year: 2017).*

(Continued)

*Primary Examiner* — Patrick N Edouard
*Assistant Examiner* — Eboni N Giles

(57) ABSTRACT

The present disclosure provides a display panel and a display device. The display panel includes a plurality of scan lines and at least one pull-down circuit unit. The pull-down circuit includes a forward scan pull-down unit and/or a reverse scan pull-down unit. The forward scan pull-down unit receives a $(n+m)^{th}$ scan signal, a first control signal, and a reference low level signal, and is connected to the $n^{th}$ scan line. The reverse scan pull-down unit receives a $(n-m)^{th}$ scan signal, a second control signal, and the reference low level signal, and is connected to the $n^{th}$ scan line.

16 Claims, 7 Drawing Sheets

(56) References Cited

U.S. PATENT DOCUMENTS

| | | | | |
|---|---|---|---|---|
| 2017/0213516 | A1* | 7/2017 | Cao | G09G 3/3674 |
| 2018/0033389 | A1* | 2/2018 | Li | G09G 3/20 |
| 2018/0299720 | A1* | 10/2018 | Hao | G02F 1/1368 |
| 2019/0163001 | A1* | 5/2019 | Gong | G06F 3/04184 |
| 2019/0325801 | A1* | 10/2019 | Xing | G09G 3/20 |

FOREIGN PATENT DOCUMENTS

| | | |
|---|---|---|
| CN | 105529006 | 4/2016 |
| CN | 106409243 | 2/2017 |
| CN | 106486048 | 3/2017 |
| CN | 106647084 | 5/2017 |
| CN | 114038387 | 2/2022 |
| JP | 10-253940 | 9/1998 |

OTHER PUBLICATIONS

International Search Report and the Written Opinion Dated Mar. 22, 2023 From the International Searching Authority Re. Application No. PCT/CN2022/116439 and Its Translation Into English. (18 Pages).

Notification of Office Action and Search Report Dated Jan. 25, 2025 From The State Intellectual Property Office of the People's Republic of China Re. Application No. 202210967492.6 and Its Translation Into English. (18 Pages).

Notification of Office Action and Search Report Dated Jun. 28, 2025 From The State Intellectual Property Office of the People's Republic of China Re. Application No. 202210967492.6 and Its Translation Into English. (22 Pages).

* cited by examiner

DISPLAY PANEL AND DISPLAY DEVICE

RELATED APPLICATIONS

This application is a National Phase of PCT Patent Application No. PCT/CN2022/116439 having International filing date of Sep. 1, 2022, which claims the benefit of Chinese Patent Application No. 202210967492.6 filed on Aug. 12, 2022. The contents of the above applications are all incorporated by reference as if fully set forth herein in their entirety.

FIELD AND BACKGROUND OF THE INVENTION

The present disclosure relates to the field of display technologies, and in particular, to a display panel and a display device.

Gate Driver On Array (GOA) is a driving method in which a gate driving circuit is integrated on an array substrate of a display panel to realize scanning line by line. In this driving method, a gate driver can be omitted, thereby achieving the advantages of reducing the production cost and realizing the panel narrow frame. Therefore, the driving method is applied for a variety of display devices.

As the size of the display panel is increased and the resolution is improved, the resistance capacitance loading (RC Loading) of scan lines is continuously increased, and the transmission loss of each scan signal output by the GOA is increased, so that the falling edges of the scan signals are seriously deteriorated, the pixel charging time is reduced, and the risk of pixel mischarging is increased.

The present disclosure provides a display panel and a display device to solve the technical problems of serious deterioration of a falling edge of a scan signal due to RC Loading, reduction of a pixel charging time, and increase of a pixel mischarging risk.

The present disclosure provides a display panel comprising:

- a plurality of scan lines disposed at intervals in a first direction; and
- at least one pull-down circuit connected to a $n^{th}$ scan line, wherein the at least one pull-down circuit is configured to pull down a potential of the $n^{th}$ scan line;
- wherein each pull-down circuit comprises a forward scan pull-down unit and/or a reverse scan pull-down unit; the forward scan pull-down unit receives a $(n+m)^{th}$ scan signal, a first control signal, and a reference low level signal, and is connected to the $n^{th}$ scan line; the reverse scan pull-down unit receives a $(n-m)^{th}$ scan signal, a second control signal, and the reference low level signal, and is connected to the $n^{th}$ scan line; both of n and m are integers greater than zero, $n \geq 2$, and $n > m$.

Optionally, in some embodiments of the present disclosure, the forward scan pull-down unit comprises a first transistor and a second transistor;

- wherein a gate of the first transistor receives one of the $(n+m)^{th}$ scan signal and the first control signal, a source of the first transistor is connected to a drain of the second transistor, and a drain of the first transistor is connected to the $n^{th}$ scan line; a gate of the second transistor receives the other of the $(n+m)^{th}$ scan signal and the first control signal, and a source of the second transistor receives the reference low level signal.

Optionally, in some embodiments of the present disclosure, the reverse scan pull-down unit comprises a third transistor and a fourth transistor;

- wherein a gate of the third transistor receives one of the $(n-m)^{th}$ scan signal and the second control signal, a source of the third transistor is connected to a drain of the fourth transistor, and a drain of the third transistor is connected to the $n^{th}$ scan line; and a gate of the fourth transistor receives the other of the $(n-m)^{th}$ scan signal and the second control signal, and a source of the fourth transistor receives the reference low level signal.

Optionally, in some embodiments of the present disclosure, the display panel has a display region in which the pull-down circuit is disposed.

Optionally, in some embodiments of the present disclosure, the display panel comprises a plurality of pull-down circuits, wherein each of the pull-down circuits is connected to one of the scan lines, and each of the scan lines is connected to at least one of the pull-down circuits.

Optionally, in some embodiments of the present disclosure, the pull-down circuits connected to two adjacent scan lines are staggered along the first direction.

Optionally, in some embodiments of the present application, each of the scan lines is connected to two of the pull-down circuits, and the pull-down circuits connected to odd numbered rows of the scan lines are located between the pull-down circuits connected to any two adjacent even numbered rows of the scan lines along an extending direction of the scan lines.

Optionally, in some embodiments of the present disclosure, the display panel further has a first non-display region and a second non-display region respectively located on two sides of the display region in an extending direction of the scan lines; the display panel further comprises a first GOA circuit disposed in the first non-display region and a second GOA circuit disposed in the second non-display region;

- wherein each of the scan lines is connected to two of the pull-down circuits, and the pull-down circuits connected to any one of odd numbered rows of the scan lines are located between the pull-down circuits connected to two adjacent even numbered rows of the scan lines, along the extending direction of the scan lines.

Optionally, in some embodiments of the present disclosure, the display panel further includes at least one first control signal line for transmitting the first control signal and at least one second control signal line for transmitting the second control signal, wherein the first control signal line and the second control signal line extend along the first direction, and each of the pull-down circuits is connected to the first control signal line and the second control signal line.

Optionally, in some embodiments of the present disclosure, the display panel has a display region, and a first non-display region and a second non-display region respectively located on two sides of the display region along an extending direction of the scan lines; and the display panel further comprises a first GOA circuit located in the first non-display region, and the at least one pull-down circuit is located in the second non-display region.

Accordingly, the present disclosure further provides a display device including a display panel and a driving device, wherein the display panel is the display panel as mentioned above, and the driving device outputs the first control signal and the second control signal to the display panel.

The present disclosure provides the display panel and the display device. The display panel comprises a plurality of scan lines and at least one pull-down unit. The plurality of scan lines are disposed at intervals in a first direction; the pull-down circuit is connected to the $n^{th}$ scan line, wherein the pull-down circuit is configured to pull down the potential of the $n^{th}$ scan line; wherein each pull-down circuit comprises the forward scan pull-down unit and/or the reverse scan pull-down unit; the forward scan pull-down unit receives the $(n+m)^{th}$ scan signal, the first control signal, and the reference low level signal, and is connected to the $n^{th}$ scan line; the reverse scan pull-down unit receives the $(n-m)^{th}$ scan signal, the second control signal, and the reference low level signal, and is connected to the $n^{th}$ scan line; both of n and m are integers greater than zero, n≥2, and n>m. According to the present disclosure, by providing a pull-down circuit connected to the $n^{th}$ scan line in the display panel, the potential of the $n^{th}$ scan line can be further pulled down, the uniformity of the falling edges of the scan signals in the display panel are increased, the charging time of pixels is increased, and mischarging is avoided. Moreover, since the pull-down circuit may include both the forward scan pull-down unit and the reverse scan pull-down unit, the display panel may achieve forward scanning and reverse scanning, by which the same screen is compatible with forward installation and reverse installation in use.

BRIEF DESCRIPTION OF THE SEVERAL VIEWS OF THE DRAWINGS

In order to more clearly explain the technical solutions in the embodiments of the present disclosure, the following will briefly introduce the drawings required in the description of the embodiments. It is apparent that the drawings in the following description are only some embodiments of the present disclosure. For those skilled in the art, without paying any creative effort, other drawings can be obtained based on these drawings.

DESCRIPTION OF SPECIFIC EMBODIMENTS OF THE INVENTION

Technical solutions in the embodiments of the present disclosure will be clearly and completely described below in conjunction with drawings in the embodiments of the present disclosure. It is apparent that the described embodiments are only some of embodiments of the present disclosure, rather than all the embodiments. Based on the embodiments in the present disclosure, all other embodiments obtained by those skilled in the art without creative effort fall within the protection scope of the present disclosure.

In the description of the present disclosure, it is to be understood that the terms "first" and "second" are used for descriptive purposes only and are not to be construed as indicating or implying relative importance or implying the number of indicated technical features. A feature that limited by "first", "second" may expressly or implicitly include at least one or more features, and thus the terms "first" and "second" cannot be construed as a limitation to the present disclosure. Furthermore, it is to be noted that the terms "connected" and "coupling" are to be understood in a broad sense, unless otherwise expressly defined and specified. For example, it can be a mechanical connection, or an electrical connection; or it can be directly connected or indirectly connected through an intermediary, it can also be an internal communication between two elements. Those ordinary skilled in the art can understand the specific meanings of the above terms in the present disclosure according to specific situations.

The present disclosure provides a display panel and a display device, which are described in detail below. It should be noted that the order of description of the following embodiments is not a definition on the preferred order of the embodiments of the present disclosure.

Figure 1:
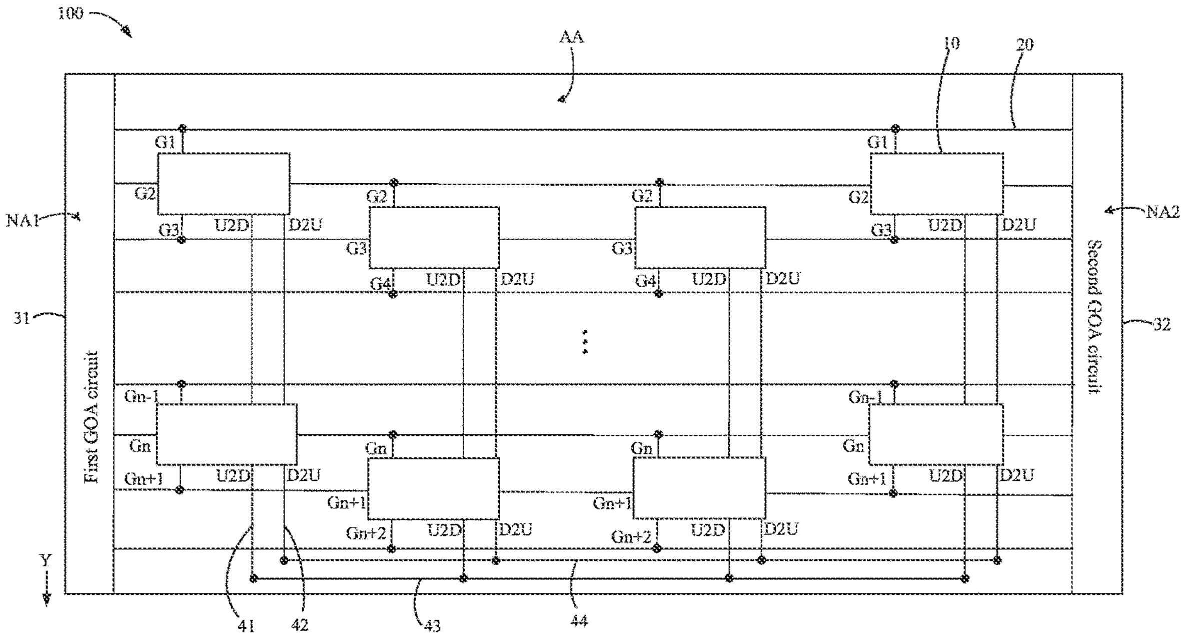
FIG. 1 is a first schematic structural diagram of a display panel according to the present disclosure.
Figure 2:
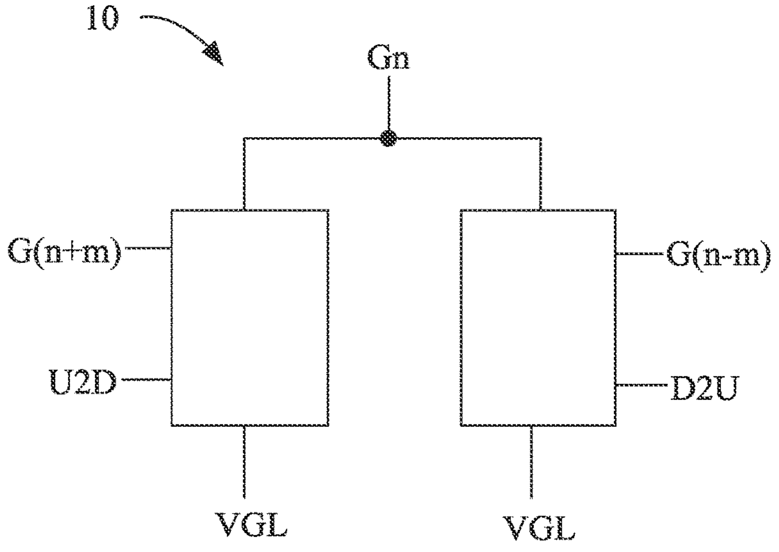
FIG. 2 is a schematic structural diagram of a pull-down circuit according to the present disclosure.

Referring to FIGS. 1 and 2, FIG. 1 is a first schematic structural view of a display panel according to the present disclosure; and FIG. 2 is a schematic structural view of a pull-down circuit according to the present disclosure. In an embodiment of the present disclosure, the display panel 100 includes a plurality of scan lines 20 and at least one pull-down circuit 10.

The plurality of scan lines 20 are disposed at intervals in a first direction Y. For example, the plurality of scan lines 20 include a first scan line G1, a second scan line G2, a third scan line G3, a fourth scan line G4, a $(n-1)^{th}$ scan line Gn−1, a $n^{th}$ scan line Gn, a $(n+1)^{th}$ scan line Gn+1, a $(n+2)^{th}$ scan line Gn+2 and so on in the first direction Y. Details are not repeatedly described herein. The at least one pull-down circuit 10 is connected to the $n^{th}$ scan line Gn. Each pull-down circuit 10 is configured to pull down a potential of the $n^{th}$ scan line Gn.

Specifically, each pull-down circuit 10 includes a forward scan pull-down unit 11 and/or a reverse scan pull-down unit 12. The forward scan pull-down unit 11 receives a $(n+m)^{th}$ scan signal G(n+m), a first control signal U2D, and a reference low level signal VGL, and is connected to the $n^{th}$ scan line Gn. The reverse scan pull-down unit 12 receives a $(n-m)^{th}$ scan signal G(n−m), a second control signal D2U, and the reference low level signal VGL, and is connected to the $n^{th}$ scan line Gn. Both of n and m are integers greater than zero, n≥2 and n>m.

According to the embodiments of the present disclosure, the at least one pull-down circuit 10 is connected to the $n^{th}$ scan line Gn in the display panel 100, so that the potential of the $n^{th}$ scan line Gn may be further pulled down, the uniformity of falling edges of scan signals in the display panel 100 can be increased, the charging time of pixels can be increased, and the mischarging can be avoided. Moreover, since each pull-down circuit 10 may include both the forward scan pull-down unit 11 and the reverse scan pull-down unit 12, the display panel 100 may realize forward scanning and reverse scanning, which can meet the application scenarios that the same screen can be installed forward or backward.

Figure 3:
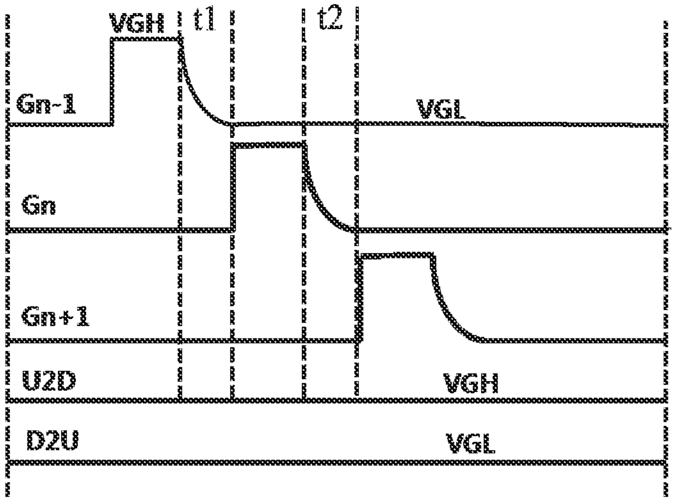
FIG. 3 is a signal timing diagram in operation of a conventional display panel according to the present disclosure.
Figure 4:
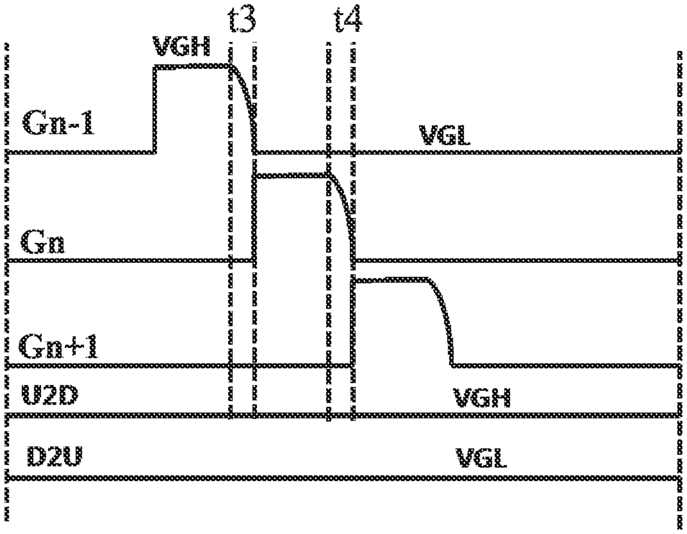
FIG. 4 is a signal timing diagram in operation of a display panel according to the present disclosure.

Certainly, in some embodiments of the present disclosure, in the case where only forward scanning or only reverse scanning is performed on the display panel 100, each pull-down circuit 10 may include either the forward scan pull-down unit 11 or the reverse scan pull-down unit 12, so as to meet the requirements of the forward installation and reverse installation of the screen. Specifically, referring to FIGS. 3 and 4, FIG. 3 is a signal timing diagram in operation of a conventional display panel according to the present disclosure; and FIG. 4 is a signal timing diagram in operation of a display panel according to the present disclosure. An embodiment of the present disclosure is illustrated with m=1 as an example, but it is not to be understood as a limitation to the present disclosure. As shown in FIG. 3, each of the scan signals is turned-on line by line. For example, when a $(n-1)^{th}$ scan signal G(n−1) is converted from high potential VGH to low potential VGL, a $n^{th}$ scan signal G(n) is converted from low potential VGL to high potential VGH. When the $n^{th}$ scan signal G(n) is converted from high potential VGH to low potential VGL, a $(n+1)^{th}$ scan signal G(n+1) is converted from low potential VGL to high potential VGH. However, as the size of the display panel is increased and the resolution is improved, RC Loading of each scan line 20 is continuously increased, and the transmission losses of scan signals are increased, so that the falling edge of each scan signal is seriously deteriorated. For example, when the $(n-1)^{th}$ scan signal G(n−1) is converted from the high potential VGH to the low potential VGL, the $(n-1)^{th}$ scan signal G(n−1) has a first falling edge t1; when the $n^{th}$ scan signal G(n) is converted from the high potential VGH to the low potential VGL, the $n^{th}$ scan signal G(n) has a second falling edge t2. The gradients of the falling edges t1 and t2 are relatively gentle, indicating that the pull-down of the $(n-1)^{th}$ scan signal G(n−1) and the $n^{th}$ scan signal G(n) from the high potential VGH to the low potential VGL is relatively gentle.

As shown in FIG. 4, in the present embodiment, when the $n^{th}$ scan signal G(n) is converted from the high potential VGH to the low potential VGL, the corresponding pull-down circuit 10 further pulls down the $n^{th}$ scan signal G(n) under the action of the $(n+1)^{th}$ scan signal G(n+1), the first control signal U2D, the $(n-1)^{th}$ scan signal G(n−1), and the second control signal D2U. At this time, the $(n+1)^{th}$ scan signal G(n+1) has a third falling edge t4. Similarly, when the $(n-1)^{th}$ scan signal G(n−1) is converted from the high potential VGH to the low potential VGL, the corresponding pull-down circuit 10 further pulls down the potential of the $(n-1)^{th}$ scan signal G(n−1). At this time, the $n^{th}$ scan signal G(n) has a fourth falling edge t3. The duration of the third and fourth falling edges t4 and t3 is relatively short, and the pull-down is relatively rapid.

It can be seen that t3=t4<t1=t2. That is, in the embodiments of the present disclosure, the potential of the $n^{th}$ scan line Gn can be further pulled down under the action of the corresponding pull-down circuit 10, thereby effectively reducing the falling edge of each scan signal.

In the embodiments of the present disclosure, each pull-down circuit 10 may be disposed in a display region or a non-display region of the display panel 100, and it may be specifically provided according to the requirements of the display panel 100. For example, in some embodiments of the present disclosure, the display panel 100 has a display region AA. The plurality of scan lines 20 are disposed within the display region AA. The at least one pull-down circuit 10 is also disposed in the display region AA.

According to the embodiments of the present disclosure, by disposing the at least one pull-down circuit 10 integrally in the display region AA, the frame of the display panel 100 can be effectively reduced, thereby realizing a narrow frame.

In an embodiment of the present disclosure, the display panel 100 may include a plurality of pull-down circuits 10. Each of the pull-down circuits 10 is connected to one of the scan lines 20. Each of the scan lines 20 is connected to at least one of the pull-down circuits 10, so as to achieve the uniformity of the falling edges of scan signals on each scan line 20. The number and location of the pull-down circuits 10 shown in FIG. 1 are illustrative only as an example and are not to be construed as limiting the present disclosure.

Specifically, in the embodiments of the present disclosure, the pull-down circuits 10 connected to two adjacent scan lines 20 are staggered in the first direction Y. For example, in a case that each scan line 20 is connected to one pull-down circuit 10, the plurality of pull-down circuits 10 connected to odd numbered rows of the scan lines 20 are arranged in one column in the first direction Y, and the plurality of pull-down circuits 10 connected to even numbered rows of the scan lines 20 are arranged in another column in the first direction Y.

It is to be understood that a pixel circuit (not shown) is further disposed in the display region AA of the display panel 100, and thus the wiring space in the display region AA is limited. According to the embodiments of the present disclosure, the pull-down circuits 10 connected to two adjacent scan lines 20 are staggered, so that the wiring space in the display region AA can be effectively utilized, and the distribution uniformity of the plurality of pull-down circuits 10 is improved, and thereby the display screen of the display panel 100 is not affected.

In the embodiments of the present disclosure, the display panel 100 may further include GOA circuits. Specifically, when the display panel 100 is operated in one-side driving, the display panel 100 may include only a first GOA circuit 31 or only a second GOA circuit 32. When the display panel 100 is operated in both-side driving, the display panel 100 may include both the first GOA circuit 31 and the second GOA circuit 32. The present disclosure is not specifically limited thereto.

In the context, the GOA circuits are configured to generate scan signals and output the scan signals to the corresponding scan lines 20. For example, the GOA circuit is configured to output the $(n-1)^{th}$ scan signal G(n−1) to the $(n-1)^{th}$ scan line Gn−1, output the $n^{th}$ scan signal G(n) to the $n^{th}$ scan line Gn, and output the $(n+1)^{th}$ scan signal G(n+1) to the $(n+1)^{th}$ scan line Gn+1.

Specifically, in the embodiments of the present disclosure, when the display panel 100 is operated in the both-side driving, the display panel 100 further has a first non-display region NA1 and a second non-display region NA2 located on two sides of the display region AA along an extending direction of the scan lines 20. The first GOA circuit 31 is disposed in the first non-display region NA1. The second GOA circuit 32 is disposed in the second non-display region NA2.

In the embodiments of the present disclosure, the pull-down circuits 10 may receive the $(n+m)^{th}$ scan signal G(n+m) and the $(n-m)^{th}$ scan signal G(n−m) by the connection to a scan signal output terminal (not shown) of the GOA circuits.

Certainly, the pull-down circuits 10 may receive the $(n+m)^{th}$ scan signal G(n+m) and the $(n-m)^{th}$ scan signal G(n−m) by the connection to the corresponding scan lines 20. For example, as shown in FIG. 1, some pull-down circuits 10 are connected to the $n^{th}$ scan line Gn, so that the pull-down circuits 10 may receive the $n^{th}$ scan signal G(n). Details are not repeatedly described herein.

It is to be noted that, the pixels in the display panel 100 are generally charged by scanning line by line. Therefore, when the $n^{th}$ scan signal G(n) is a high level signal, it is necessary to pull down the $(n-1)^{th}$ scan signal G(n−1). When the $(n+1)^{th}$ scan signal G(n+1) is a high level signal, it is necessary to pull down the $n^{th}$ scan signal G(n). Therefore, pull-down modules are disposed in each of the first GOA circuit 31 and the second GOA circuit 32. The pull-down modules in the first GOA circuit 31 and the second GOA circuit 32 are independent of the pull-down circuits 10 of the present disclosure, while all of the pull-down modules and the pull-down circuits 10 are used to pull down corresponding scan signals.

In embodiments of the present disclosure, both of n and m are integers greater than zero. Here, the value of n may be determined according to the driving structure of the display panel 100 and the number of scan lines. The value of m may be determined according to the cascade relationship of GOA cells in the GOA circuit (the first GOA circuit 31/the second GOA circuit 32). For example, m may be 1, 2, 3, 4, or the like, and details are not repeatedly described herein.

It is to be noted that the embodiments of the present disclosure are illustrated in FIG. 1 with m=1 as an example, but are not to be construed as limiting the present disclosure.

In the embodiments of the present disclosure, the display panel 100 further includes at least one first control signal line 41 and at least one second control signal line 42. The at least one first control signal line 41 is configured to transmit the first control signal U2D. The at least one second control signal line 42 is configured to transmit the second control signal D2U. Both of the first control signal line 41 and the second control signal line 42 extend in the first direction Y, and each pull-down circuit 10 is connected to the first control signal line 41 and the second control signal line 42.

When the plurality of pull-down circuits 10 are arranged in a plurality of columns along the extending direction of the scan lines 20, one first control signal line 41 and one second control signal line 42 may be disposed corresponding to each column of pull-down circuits 10. Alternatively, one first control signal line 41 and one second control signal line 42 may be disposed between two adjacent columns of pull-down circuits 10, and the two adjacent columns of pull-down circuits 10 are connected to the same first control signal line 41 and to the same second control signal line 42. As a result, the wiring in the display panel 100 can be regular, so as to avoid signal crosstalk.

It is to be noted that the reference low level signal VGL is also a signal required in the display panel 100, and the pull-down circuits 10 may be connected to transmission lines of the original reference low level signal VGL in the display panel 100. Certainly, it is also possible to provide additional signal line to transmit the reference low level signal VGL required in the pull-down circuits 10.

In some embodiments of the present disclosure, each scan line 20 may be connected to two pull-down circuits 10. The pull-down circuits 10 connected to t odd numbered rows of the scan lines 20 are located between any two adjacent pull-down circuits 10 connected to even numbered rows of the scan lines 20 along the extending direction of the scan lines 20.

In one aspect, when the size of the display panel 100 is large, the scan lines 20 have large extension lengths, the RC loading is large, and the transmission waveforms of scan signals on the same one scan line 20 are different, so that the falling edges of the scan signals are not uniform. According to the embodiments of the present disclosure, each scan line 20 is connected to two pull-down circuits 10, so that the potential of each scan line 20 can be pulled down at different positions of the corresponding one of the scan lines 20, and the uniformity of the falling edges of the scan signals in the display panel 100 can be further improved by combining the pull-down functions of the first GOA circuit 31 and the second GOA circuit 32.

In another aspect, by disposing the pull-down circuits 10 connected to the any one of odd numbered rows of the scan lines 20 between the pull-down circuits 10 connected to two adjacent even numbered rows of the scan lines 20, the wiring in the plane can be regular, so as to improve the utilization rate in wiring space.

Moreover, the display panel 100 further includes a first connection line 43 and a second connection line 44. The extension direction of the first connection line 43 and the second connection line 44 is the same as that of the scan lines 20. The first connection line 43 and the second connection line 44 may be disposed in the display region AA, or may be disposed in the non-display region of the lower frame of the display panel 100.

It is to be understood that when the display panel 100 includes a plurality of first control signal lines 41 and a plurality of second control signal lines 42, the first connection line 43 is connected to the plurality of first control signal lines 41 and the second connection line 44 is connected to the plurality of second control signal lines 42. Thus, the first control signal U2D can be transmitted to the plurality of first control signal lines 41 through the first connection line 43, and the second control signal D2U can be transmitted to the plurality of second control signal lines 42 through the second connection line 44.

Figure 5:
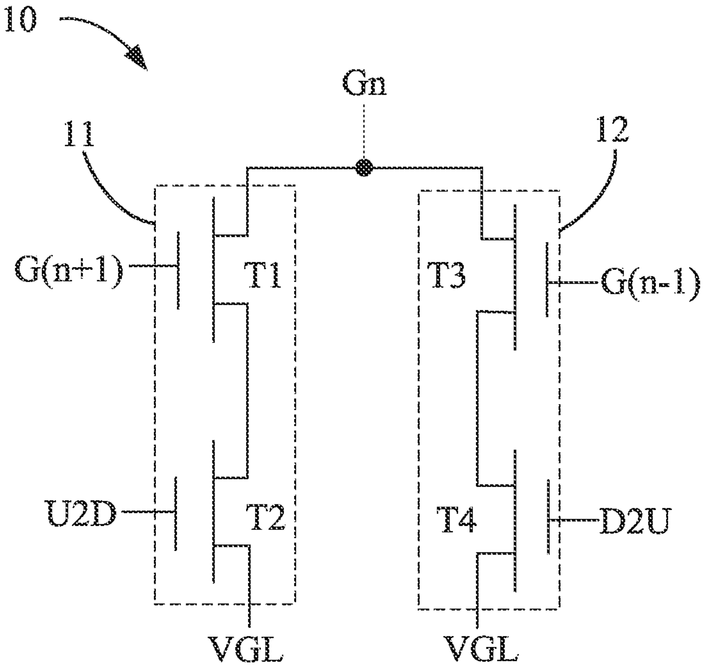
FIG. 5 is a first schematic circuit diagram of a pull-down circuit according to the present disclosure.

Referring to FIGS. 2 and 5, FIG. 5 is a first schematic circuit diagram of a pull-down circuit according to the present disclosure. In some embodiments of the present disclosure, the forward scan pull-down unit 11 includes a first transistor T1 and a second transistor T2.

A gate of the first transistor T1 receives the $(n+m)^{th}$ scan signal G(n+m). A source of the first transistor T1 is connected to a drain of the second transistor T2. A drain of the first transistor T1 is connected to the $n^{th}$ scan line Gn. A gate of the second transistor T2 receives the first control signal U2D. A source of the second transistor T2 receives the reference low level signal VGL.

When m=1, the gate of the first transistor T1 receives the $(n+1)^{th}$ scan signal G(n+1). The forward scan pull-down unit 11 is configured to pull down the potential of the $n^{th}$ scan line Gn when the display panel 100 is forward scanned.

Moreover, in the embodiments of the present disclosure, the reverse scan pull-down unit 12 includes a third transistor T3 and a fourth transistor T4.

A gate of the third transistor T3 receives the $(n-m)^{th}$ scan signal G(n−m). A source of the third transistor T3 is connected to a drain of the fourth transistor T4. A drain of the third transistor T3 is connected to the $n^{th}$ scan line Gn. A gate of the fourth transistor T4 receives the second control signal D2U. A source of the fourth transistor T4 receives the reference low level signal VGL.

When m=1, the gate of the third transistor T3 receives the $(n-1)^{th}$ scan signal G(n−1). The reverse scan pull-down unit 12 is configured to pull down the potential of the $n^{th}$ scan line Gn when the display panel 100 is reverse scanned.

It is to be noted that the transistors employed in all embodiments of the present disclosure may be thin film transistors, field effect transistors or other devices having the same characteristics. Since the source and the drain of the transistors employed herein are symmetrical, the source and the drain thereof are interchangeable. In the embodiments of the present disclosure, in order to distinguish two electrodes of one of the transistors except the gate, one of the electrodes is referred to as a source and the other of the electrodes is referred to as a drain. According to the configuration in the drawings, it is specified that the middle end of a switching transistor is a gate, the signal input end is a source, and the output end is a drain. In addition, the transistors used in the embodiments of the present disclosure may include a P-type transistor and/or a N-type transistor, wherein the P-type transistor is turned on when the gate is in a low level, and the P-type transistor is turned off when the gate is in a high level; the N-type transistor is turned on when the gate is in a high level and the N-type transistor is turned off when the gate is in a low level.

In addition, the transistors in the following examples of the present disclosure are described by using N-type transistors as an example, but are not to be construed as limiting the present disclosure.

Figure 6:
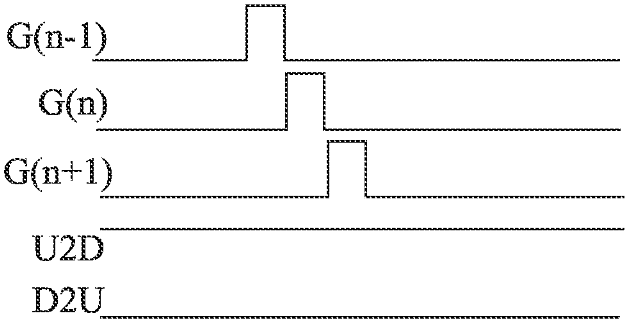
FIG. 6 is a signal timing diagram of the pull-down circuit shown in FIG. 5 when the display panel is forward scanned.

Referring to FIGS. 5 and 6, FIG. 6 is a signal timing diagram of the pull-down circuit shown in FIG. 5 when the display panel is forward scanned. When the forward scanning is performed, the first control signal U2D maintains at a high level, and the second transistor T2 is turned on. The second control signal D2U maintains at a low level, and the fourth transistor T4 is turned off. That is, in the forward scanning, the forward scan pull-down unit 11 is in the operating state, and the reverse scan pull-down unit 12 is in the non-operating state.

When the GOA circuits output the high-level $n^{th}$ scan signal G(n) to the $n^{th}$ scan line Gn, the pixels connected to the $n^{th}$ scan line Gn start to be charged. Next, when the GOA circuits output the high-level $(n+1)^{th}$ scan signal G(n+1) to the $(n+1)^{th}$ scan line Gn+1, the pixels connected to the $(n+1)^{th}$ scan line Gn+1 start to be charged. When the $(n+1)^{th}$ scan signal G(n+1) is at a high level, the first transistor T1 is turned on, and the reference low level signal VGL is transmitted to the $n^{th}$ scan line Gn via the second transistor T2 and the first transistor T1, thereby further pulling down the potential of the $n^{th}$ scan line Gn, improving the falling edge uniformity of the scan signals on the $n^{th}$ scan line Gn, increasing the charging time of the pixels, and avoiding mischarging.

Figure 7:
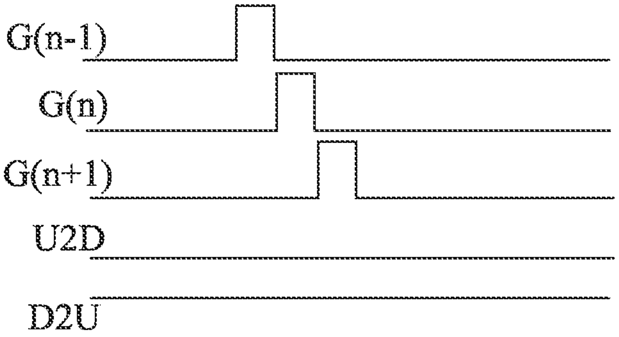
FIG. 7 is a signal timing diagram of the pull-down circuit shown in FIG. 5 when the display panel is reverse scanned.

Referring to FIGS. 5 and 7, FIG. 7 is a signal timing diagram of the pull-down circuit shown in FIG. 5 when the display panel is reverse scanned. In the reverse scanning, the first control signal U2D maintains at a low level and the second transistor T2 is turned off. The second control signal D2U maintains at a high level and the fourth transistor T4 is turned on. That is, in the reverse scanning, the forward scan pull-down unit 11 is in the non-operating state, and the reverse scan pull-down unit 12 is in the operating state.

When the GOA circuits output the high-level $n^{th}$ scan signal G(n) to the $n^{th}$ scan line Gn, the pixels connected to the $n^{th}$ scan line Gn start to be charged. Next, when the GOA circuits output the high-level $(n-1)^{th}$ scan signal G(n−1) to the $(n-1)^{th}$ scan line Gn−1, the pixels connected to the $(n-1)^{th}$ scan line Gn−1 start to be charged. When the $(n-1)^{th}$ scan signal G(n−1) is at a high level, the third transistor T3 is turned on, and the reference low level signal VGL is transmitted to the $n^{th}$ scan line Gn via the fourth transistor T4 and the third transistor T3, further thereby pulling down the potential of the $n^{th}$ scan line Gn, improving the falling edge uniformity of the scan signals on the $n^{th}$ scan line Gn, increasing the charging time of the pixels, and avoiding mischarging.

Figure 8:
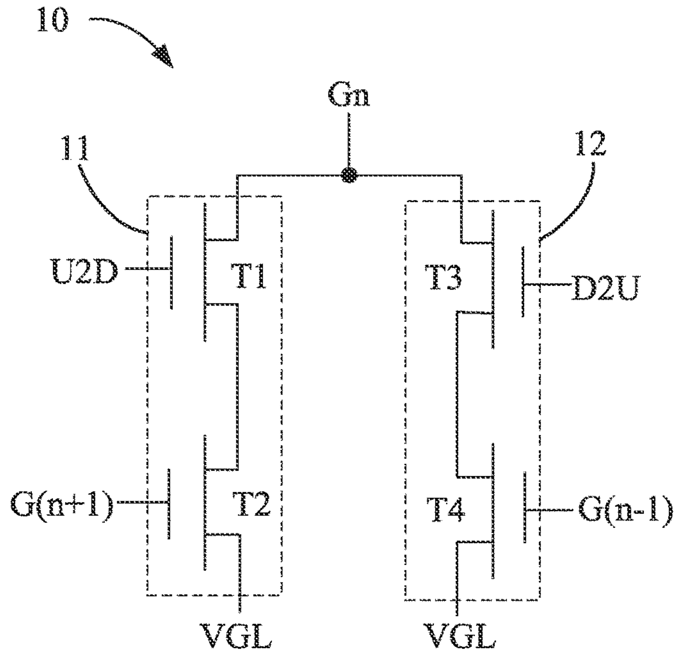
FIG. 8 is a second schematic circuit diagram of a pull-down circuit according to the present disclosure.

Referring to FIG. 8, it is a second schematic circuit diagram of a pull-down circuit according to the present disclosure. The corresponding one of the pull-down circuits in FIG. 8 is different from the corresponding one of the pull-down circuits 10 shown in FIG. 5 at least in that, in the present embodiment, the gate of the first transistor T1 receives the first control signal U2D. The source of the first transistor T1 is connected to the drain of the second transistor T2. The drain of the first transistor T1 is connected to the $n^{th}$ scan line Gn. The gate of the second transistor T2 receives the $(n+m)^{th}$ scan signal G(n+m). The source of the second transistor T2 receives the reference low level signal VGL.

When m=1, the gate of the second transistor T2 receives the $(n+1)^{th}$ scan signal G(n+1). The forward scan pull-down unit 11 is configured to pull down the potential of the $n^{th}$ scan line Gn when the display panel 100 is forward scanned.

In addition, the gate of the third transistor T3 receives the second control signal D2U. The source of the third transistor T3 is connected to the drain of the fourth transistor T4. The drain of the third transistor T3 is connected to the $n^{th}$ scan line Gn. The gate of the fourth transistor T4 receives the $(n-m)^{th}$ scan signal G(n−m). The source of the fourth transistor T4 receives the reference low level signal VGL.

When m=1, the gate of the third transistor T3 receives the $(n-1)^{th}$ scan signal G(n−1). The reverse scan pull-down unit 12 is configured to pull down the potential of the $n^{th}$ scan line Gn when the display panel 100 is reverse scanned.

It is to be noted that the signal timing diagram of the pull-down circuit 10 shown in FIG. 8 is the same as that of the pull-down circuit 10 shown in FIG. 5, and details are not repeatedly described herein.

Figure 9:
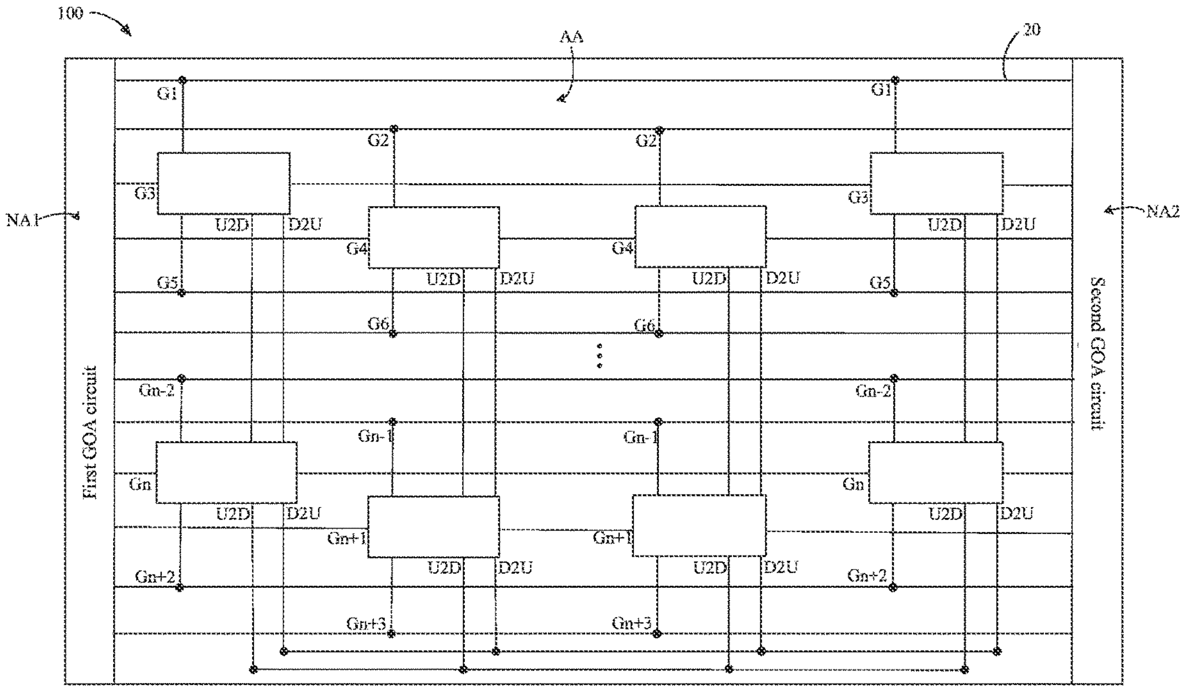
FIG. 9 is a second schematic structural diagram of a display panel according to the present disclosure.

Referring to FIG. 9, it is a second schematic structural view of a display panel according to the present disclosure. FIG. 9 differs from the display panel 100 shown in FIG. 1 in that m=2 in the embodiment of the present disclosure. For example, when the pull-down circuits 10 are connected to the $(n+1)^{th}$ scan line Gn+1 to pull down the potential of the $(n+1)^{th}$ scan line Gn+1, the pull-down circuits 10 are connected to the $(n-1)^{th}$ scan line Gn−1 to receive the $(n-1)^{th}$ scan signal G(n−1). Meanwhile, the pull-down circuit 10 is connected to the $(n+3)^{th}$ scan line Gn+3 to receive the $(n+3)^{th}$ scan signal G(n+3).

Figure 10:
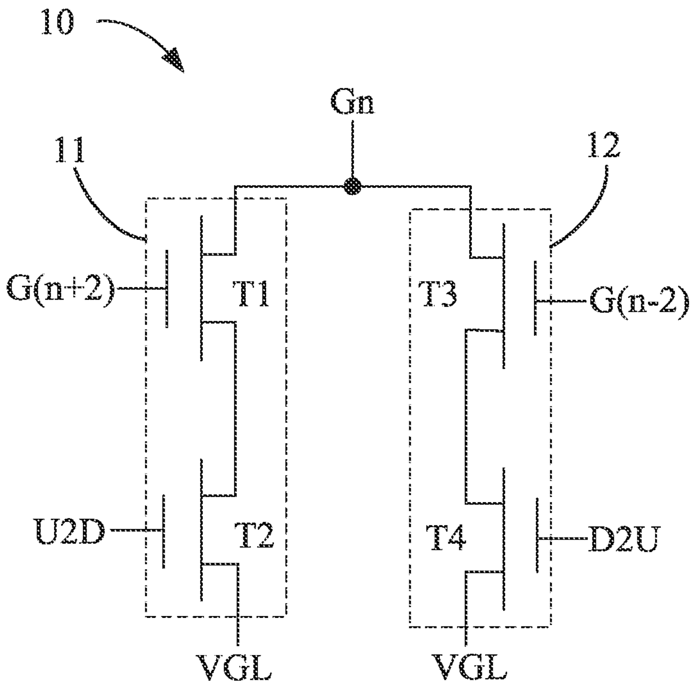
FIG. 10 is a third schematic circuit diagram of a pull-down circuit according to the present disclosure.

Referring to FIG. 10, it is a third schematic circuit view of a pull-down circuit according to the present disclosure. In the embodiments of the present disclosure, the gate of the first transistor T1 receives the $(n+2)^{th}$ scan signal G(n+2). The source of the first transistor T1 is connected to the drain of the second transistor T2. The drain of the first transistor T1 is connected to the $n^{th}$ scan line Gn. The gate of the second transistor T2 receives the first control signal U2D. The source of the second transistor T2 receives the reference low level signal VGL.

The gate of the third transistor T3 receives the $(n-2)^{th}$ scan signal G(n−2). The source of the third transistor T3 is connected to the drain of the fourth transistor T4. The drain of the third transistor T3 is connected to the $n^{th}$ scan line Gn. The gate of the fourth transistor T4 receives the second control signal D2U. The source of the fourth transistor T4 receives the reference low level signal VGL.

Figure 11:
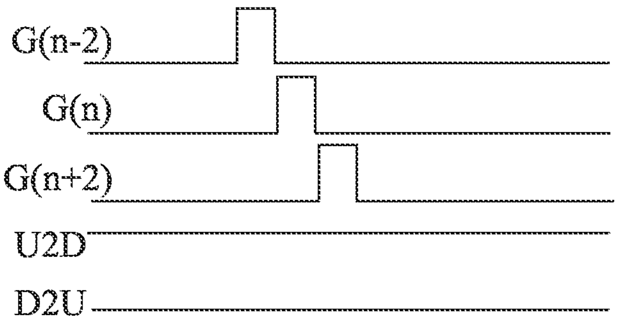
FIG. 11 is a signal timing diagram of the pull-down circuit shown in FIG. 10 when the display panel is forward scanned.

Referring to FIGS. 10 and 11, FIG. 11 is a signal timing diagram of the pull-down circuit shown in FIG. 10 when the display panel is forward scanned. In the forward scanning, the first control signal U2D maintains at a high level, and the second transistor T2 is turned on. The second control signal D2U maintains at a low level, and the fourth transistor T4 is turned off. That is, in the forward scanning, the forward scan pull-down unit 11 is in the operating state, and the reverse scan pull-down unit 12 is in the non-operating state.

When the GOA circuit outputs the high-level $n^{th}$ scan signal G(n) to the $n^{th}$ scan line Gn, the pixels connected to the $n^{th}$ scan line Gn start to be charged. Next, when the GOA circuit outputs the high-level $(n+2)^{th}$ scan signal G(n+2) to the $(n+2)^{th}$ scan line Gn+2, the pixels connected to the $(n+2)^{th}$ scan line Gn+2 start to be charged. When the $(n+2)^{th}$ scan signal G(n+2) is at a high level, the first transistor T1 is turned on, and the reference low level signal VGL is transmitted to the $n^{th}$ scan line Gn via the second transistor T2 and the first transistor T1, thereby further pulling down the potential of the $n^{th}$ scan line Gn, improving the falling edge uniformity of the scan signals on the $n^{th}$ scan line Gn, increasing the charging time of the pixels, and avoiding mischarging.

Figure 12:
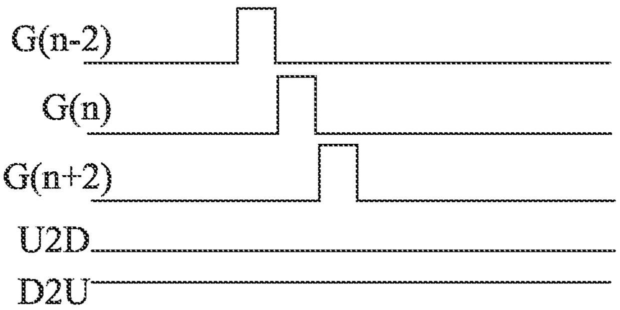
FIG. 12 is a signal timing diagram of the pull-down circuit shown in FIG. 10 when the display panel is reverse scanned.

Referring to FIGS. 10 and 12, FIG. 12 is a signal timing diagram of the pull-down circuit shown in FIG. 10 when the display panel is reverse scanned. In the reverse scanning, the first control signal U2D maintains at a low level, and the second transistor T2 is turned off. The second control signal D2U maintains at a high level, and the fourth transistor T4 is turned on. That is, in the reverse scanning, the forward scan pull-down unit 11 is in the non-operating state, and the reverse scan pull-down unit 12 is in the operating state.

When the GOA circuit outputs the high-level $n^{th}$ scan signal G(n) to the $n^{th}$ scan line Gn, the pixels connected to the $n^{th}$ scan line Gn start to be charged. Next, when the GOA circuit outputs the high-level $(n-2)^{th}$ scan signal G(n−2) to the $(n-2)^{th}$ scan line Gn−2, the pixels connected to the $(n-2)^{th}$ scan line Gn−2 start to be charged. When the $(n-2)^{th}$ scan signal G(n−2) is in a high level, the third transistor T3 is turned on, and the reference low level signal VGL is transmitted to the $n^{th}$ scan line Gn via the fourth transistor T4 and the third transistor T3, thereby further pulling down the potential of the $n^{th}$ scan line Gn, improving the falling edge uniformity of the scan signals on the $n^{th}$ scan line Gn, increasing the charging time of the pixels, and avoiding mischarging.

Figure 13:
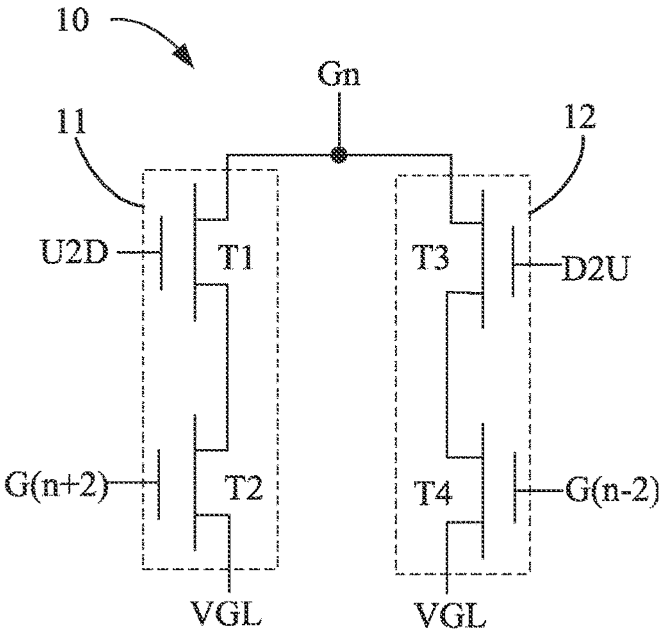
FIG. 13 is a fourth schematic circuit diagram of a pull-down circuit according to the present disclosure.

Referring to FIG. 13, it is a schematic fourth circuit view of a pull-down circuit according to the present disclosure. The pull-down circuit 10 of FIG. 13 differs from the pull-down circuit 10 shown in FIG. 10 at least in that, in the present embodiment, the gate of the first transistor T1 receives the first control signal U2D. The source of the first transistor T1 is connected to the drain of the second transistor T2. The drain of the first transistor T1 is connected to the $n^{th}$ scan line Gn. The gate of the second transistor T2 receives the $(n+2)^{th}$ scan signal G(n+2). The source of the second transistor T2 receives the reference low level signal VGL.

In addition, the gate of the third transistor T3 receives the second control signal D2U. The source of the third transistor T3 is connected to the drain of the fourth transistor T4. The drain of the third transistor T3 is connected to the $n^{th}$ scan line Gn. The gate of the fourth transistor T4 receives the $(n-m)^{th}$ scan signal G(n−2). The source of the fourth transistor T4 receives the reference low level signal VGL.

It is to be noted that the signal timing diagram of the pull-down circuit 10 shown in FIG. 13 is the same as that of the pull-down circuit 10 shown in FIG. 10, and details are not repeatedly described herein.

Figure 14:
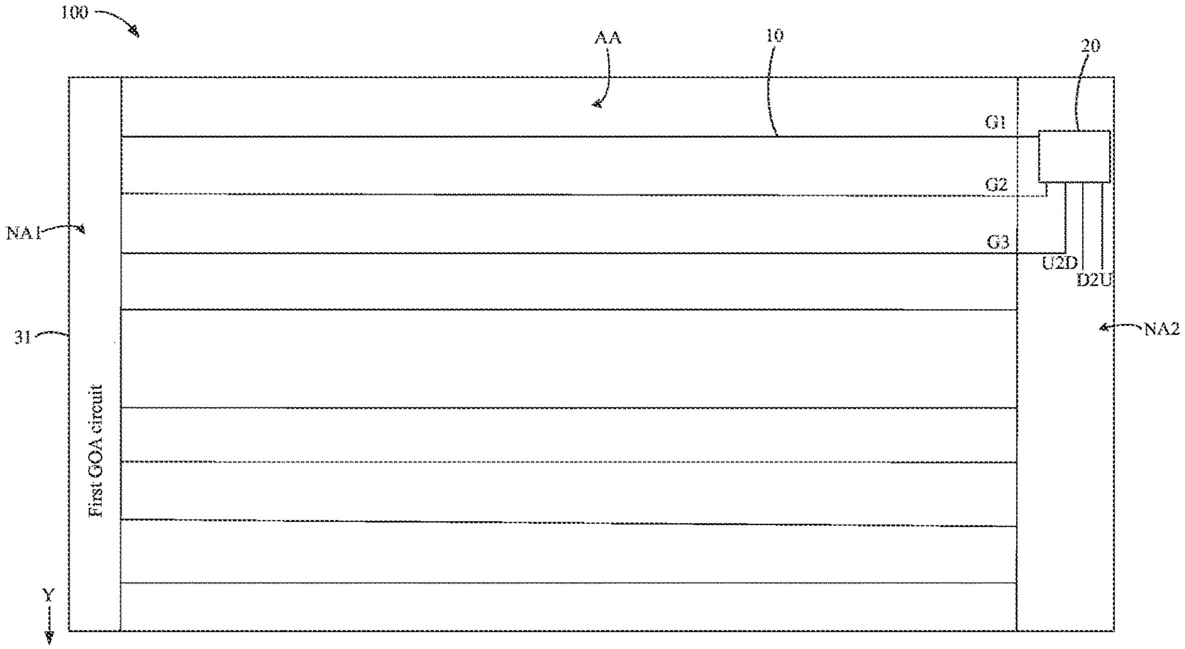
FIG. 14 is a third schematic structural diagram of a display panel according to the present disclosure.

Referring to FIG. 14, it is a third schematic structural diagram of a display panel according to the present disclosure. The display panel of FIG. 14 differs from the display panel 100 shown in FIG. 1 in that in the present embodiment, the display panel 100 includes only the first GOA circuit 31. The first GOA circuit 31 is located in the first non-display region NA1. The pull-down circuits 10 are located in the second non-display region NA2.

In the embodiments of the present disclosure, the display panel 100 is operated in one-side driving. In the same scan line 20, the scan signal is transmitted from the first GOA circuit 31 to the direction away from the first GOA circuit 31. When the size of the display panel 100 is large, the extension length of the scan lines 20 is long and the RC loading is large. In the direction along which the scan lines 20 extend, the transmission loss of the scan signal gradually increases. When the first GOA circuit 31 pulls down the potential of the scan signal, the falling edge of the scan signal at each location on the corresponding scan line 20 is not uniform.

In the embodiments of the present disclosure, the pull-down circuits 10 are disposed in the second non-display region NA2, and the pull-down circuits 10 and the first GOA circuit 31 can pull down the potential of each of the scan line 20 at both ends of the scan line 20, thereby further improving the uniformity of the falling edge of the scan signal in the display panel 100 and avoiding occurrence of pixel mischarging.

Accordingly, the present disclosure further provides a display device. The display device includes a display panel. The display panel is the display panel 100 according to any one of the above embodiments, and details are not repeatedly described herein.

Moreover, the display device may be a smartphone, a tablet computer, an electronic book reader, a smart watch, a video camera, a game machine, or the like, which is not limited in the present disclosure.

Figure 15:
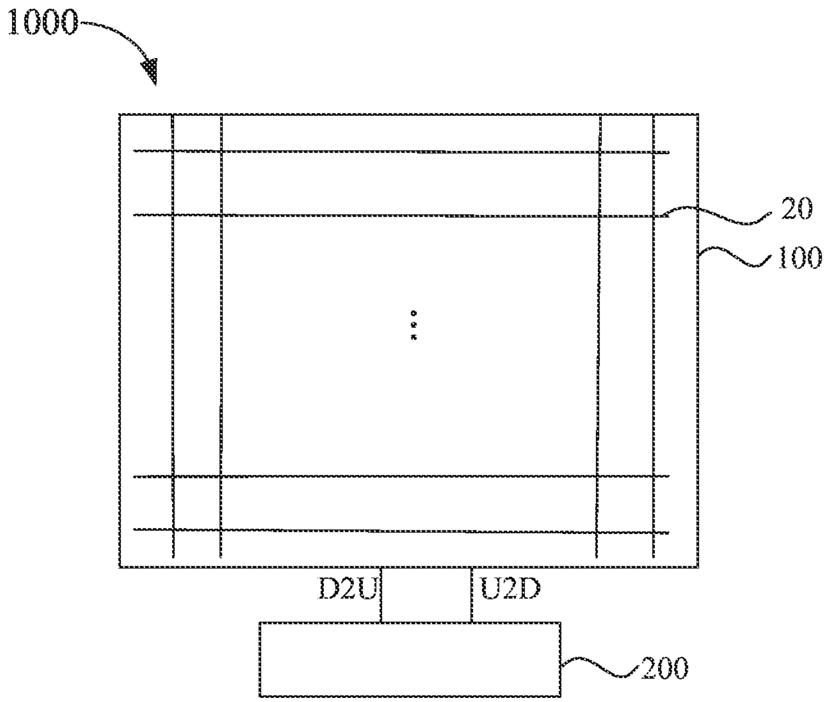
FIG. 15 is a schematic structural diagram of a display device according to the present disclosure.

Specifically, referring to FIG. 15, it is a schematic structural diagram of a display device according to the present disclosure. The display device 1000 includes a display panel 100 and a driving device 200. The driving device 200 outputs the first control signal U2D and the second control signal D2U to the display panel 100.

The driving device 200 may include a source driving chip, a circuit board, and the like. The first control signal U2D and the second control signal D2U may be output from the source driving chip. The first control signal U2D and the second control signal D2U may also be output by the power management integrated chip on the circuit board. The driving device is not specifically limited in the present disclosure.

In the embodiments of the present disclosure, the display device 1000 includes a display panel 100 in which pull-down circuits are disposed, so as to further pull-down the potential of the scan lines 20, increase the falling edge uniformity of the scan signal in the display panel 100, increase the charging time of the pixels, and avoid mischarging. In addition, since the pull-down circuits may include both the forward scan pull-down unit and the reverse scan pull-down unit, the display panel may realize forward scanning and reverse scanning, which can meet the application scenarios that the same screen is installed forward and backforward.

The present invention has been described in detail with reference to a display panel and a display device according to the embodiments of the present invention. Specific examples are used to illustrate the principles and embodiments of the present invention. The description of the above 10 embodiments is merely provided to help understand the method of the present invention and its core idea. For those of ordinary skill in the art, changes may be made in the specific implements and the application scope in accordance with the teachings of the present disclosure. In view of the foregoing, the specification should not be construed as limiting the present disclosure.

What is claimed is:

1. A display panel, comprising:

a plurality of scan lines disposed at intervals in a first direction and configured to transmit a plurality of scan signals from a gate driver on array (GOA) circuit of the display panel; and at least one pull-down circuit respectively connected to at least one scan line of the scan lines and configured to pull down a potential of at least one of the scan signals transmitted by the at least one scan line from the GOA circuit, wherein for an nth pull-down circuit of the at least one pull-down circuit, the nth pull-down circuit is connected to an nth scan line of the scan lines;

wherein the nth pull-down circuit comprises a forward scan pull-down unit and a reverse scan pull-down unit connected in parallel, wherein the forward scan pull-down unit comprises a first transistor and a second transistor, wherein a gate of the first transistor receives one of an (n+m)th scan signal from an (n+m)th scan line of the scan lines and a first control signal, a source of the first transistor is connected to a drain of the second transistor, and a drain of the first transistor is connected to the nth scan line, $n \geq 2$, and $n > m$, wherein a gate of the second transistor receives the other of the (n+m)th scan signal and the first control signal, and a source of the second transistor receives a reference low level signal, wherein the reverse scan pull-down unit comprises a third transistor and a fourth transistor, and wherein a gate of the third transistor receives one of an (n−m)th scan signal from an (n−m)th scan line of the scan lines and a second control signal, a source of the third transistor is connected to a drain of the fourth transistor, and a drain of the third transistor is connected to the nth scan line; and a gate of the fourth transistor receives the other of the (n−m)th scan signal and the second control signal, and a source of the fourth transistor receives the reference low level signal.

2. The display panel according to claim 1, wherein the display panel has a display region in which the at least one pull-down circuit is disposed.

3. The display panel according to claim 2, wherein the display panel comprises a plurality of pull-down circuits, wherein each of the pull-down circuits is connected to one of the scan lines, and each of the scan lines is connected to at least one of the pull-down circuits.

4. The display panel according to claim 3, wherein the pull-down circuits connected to two adjacent scan lines are staggered along the first direction.

5. The display panel according to claim 3, wherein each of the scan lines is connected to two of the pull-down circuits, and the pull-down circuits connected to odd numbered rows of the scan lines are located between any two adjacent pull-down circuits connected to even numbered rows of the scan lines along an extending direction of the scan lines.

6. The display panel according to claim 3, wherein the display panel further comprises a first non-display region and a second non-display region respectively located on two sides of the display region in an extending direction of the scan lines; and the GOA circuit further comprises a first GOA circuit disposed in the first non-display region and a second GOA circuit disposed in the second non-display region; and wherein each of the scan lines is connected to two of the pull-down circuits, and the pull-down circuits connected to odd numbered rows of the scan lines are located between any two adjacent pull-down circuits connected to even numbered rows of the scan lines along the extending direction of the scan lines.

7. The display panel according to claim 3, wherein the display panel further comprises at least one first control signal line for transmitting the first control signal and at least one second control signal line for transmitting the second control signal, wherein the first control signal line and the second control signal line extend along the first direction, and each of the pull-down circuits is connected to the first control signal line and the second control signal line.

8. The display panel according to claim 1, wherein the display panel comprises a display region, and a first non-display region and a second non-display region respectively located on two sides of the display region along an extending direction of the scan lines; and the GOA circuit further comprises a first GOA circuit located in the first non-display region, and the at least one pull-down circuit is located in the second non-display region.

9. A display device comprising a display panel and a driving device, wherein the display panel is the display panel according to claim 1, and the driving device outputs the first control signal and the second control signal to the display panel.

10. The display device according to claim 9, wherein the display panel has the display region in which the at least one pull-down circuit is disposed.

11. The display device according to claim 10, wherein the display panel comprises a plurality of pull-down circuits, wherein each of the pull-down circuits is connected to one of the scan lines, and each of the scan lines is connected to at least one of the pull-down circuits.

12. The display device according to claim 11, wherein the pull-down circuits connected to two adjacent scan lines are staggered along the first direction.

13. The display device according to claim 11, wherein each of the scan lines is connected to two of the pull-down circuits, and the pull-down circuits connected to odd numbered rows of the scan lines are located between any two adjacent pull-down circuits connected to even numbered rows of the scan lines along an extending direction of the scan lines.

14. The display device according to claim 11, wherein the display panel further comprises a first non-display region and a second non-display region respectively located on two sides of the display region in an extending direction of the scan lines; and the GOA circuit further comprises a first GOA circuit disposed in the first non-display region and a second GOA circuit disposed in the second non-display region; and wherein each of the scan lines is connected to two of the pull-down circuits, and the pull-down circuits connected to odd numbered rows of the scan lines are located between any two adjacent pull-down circuits connected to even numbered rows of the scan lines, along the extending direction of the scan lines.

15. The display device according to claim 11, further comprising at least one first control signal line for transmitting the first control signal and at least one second control signal line for transmitting the second control signal, wherein the first control signal line and the second control signal line extend along the first direction, and each of the pull-down circuits is connected to the first control signal line and the second control signal line.

16. The display device according to claim 9, wherein the display panel comprises a display region, and a first non-display region and a second non-display region respectively located on two sides of the display region along an extending direction of the scan lines; and the GOA circuit further comprises a first GOA circuit located in the first non-display region, and the at least one pull-down circuit is located in the second non-display region.

* * * * *